(12) United States Patent
Wooldridge et al.

(10) Patent No.: US 9,157,722 B2
(45) Date of Patent: *Oct. 13, 2015

(54) TOUCH TRIGGER MEASUREMENT PROBE

(71) Applicant: RENISHAW PLC, Wotton-Under-Edge, Gloucestershire (GB)

(72) Inventors: Michael John Wooldridge, Stroud (GB); Peter Kenneth Hellier, Dursley (GB); Robert Charles D'Olier Umfreville, Tytherington (GB)

(73) Assignee: RENISHAW PLC, Wotton-Under-Edge (GB)

(*) Notice: Subject to any disclaimer, the term of this patent is extended or adjusted under 35 U.S.C. 154(b) by 5 days.

This patent is subject to a terminal disclaimer.

(21) Appl. No.: 14/169,797

(22) Filed: Jan. 31, 2014

(65) Prior Publication Data

US 2014/0144033 A1   May 29, 2014

Related U.S. Application Data

(63) Continuation of application No. 12/918,895, filed as application No. PCT/GB2009/000640 on Mar. 9, 2009, now Pat. No. 8,676,533.

(30) Foreign Application Priority Data

Mar. 11, 2008   (GB) .................................. 0804467.9

(51) Int. Cl.
*G01B 21/04*   (2006.01)
*G01B 5/012*   (2006.01)
*G01B 7/012*   (2006.01)

(52) U.S. Cl.
CPC ................ *G01B 5/012* (2013.01); *G01B 7/012* (2013.01); *G01B 21/047* (2013.01); *G01B 2210/58* (2013.01)

(58) Field of Classification Search
CPC ..................................................... G01B 21/047
USPC ........................................................... 702/141
See application file for complete search history.

(56) References Cited

U.S. PATENT DOCUMENTS

| 4,333,238 A | 6/1982 | McMurtry |
| 4,934,065 A | 6/1990 | Hajdukiewicz et al. |

(Continued)

FOREIGN PATENT DOCUMENTS

| CN | 85105480 A | 1/1987 |
| CN | 1771425 A | 5/2006 |

(Continued)

OTHER PUBLICATIONS

Jun. 5, 2012 Office Action issued in Chinese Application No. 200980108532.4 (with English translation).

(Continued)

*Primary Examiner* — Bryan Bui
(74) *Attorney, Agent, or Firm* — Oliff PLC

(57) ABSTRACT

A measurement probe, for a co-ordinate positioning apparatus such as a machine tool, is described that includes a stylus holder that is deflectably mounted to a probe housing. One or more sensors are provided for sensing deflection of the stylus holder relative to the probe housing. A processor is included for producing a trigger signal when the deflection sensed by the one or more sensors meets a trigger condition, such as a deflection threshold. The probe also includes an accelerometer for measuring acceleration of the measurement probe. The trigger condition applied by the processor is alterable, during use, in response to the acceleration measured by the accelerometer. In this manner, false triggering can be suppressed.

6 Claims, 2 Drawing Sheets

(56) References Cited

U.S. PATENT DOCUMENTS

| | | |
|---|---|---|
| 5,862,604 A | 1/1999 | Fuchs et al. |
| 6,487,785 B1 | 12/2002 | Ritz |
| 2007/0028677 A1* | 2/2007 | McFarland et al. ............. 73/105 |
| 2008/0000288 A1 | 1/2008 | Bley |
| 2010/0292956 A1 | 11/2010 | Prestidge et al. |

FOREIGN PATENT DOCUMENTS

| | | |
|---|---|---|
| CN | 1882821 A | 12/2006 |
| CN | 101084424 A | 12/2007 |
| EP | 0 521 703 B1 | 11/1995 |
| GB | 2 328 025 A | 2/1999 |
| JP | A-55-154408 | 12/1980 |
| WO | WO 2004/090467 A1 | 10/2004 |
| WO | 2005/050134 A1 | 6/2005 |
| WO | 2006/069877 A1 | 7/2006 |
| WO | WO 2006/100508 A1 | 9/2006 |
| WO | WO 2006/120403 A1 | 11/2006 |
| WO | WO 2006/134360 A1 | 12/2006 |

OTHER PUBLICATIONS

Jun. 4, 2013 Office Action issued in Japanese Patent Application No. 2010-550252 (with English translation).

Jan. 4, 2013 Office Action issued in Chinese Patent Application No. 200980108532.4 (with translation).

Aug. 10, 2011 Office Action issued in Chinese Application No. 200980108532.4 (with English translation).

British Search Report dated Jun. 18, 2008 in British Patent Application No. GB0804467.9.

International Search Report dated Sep. 4, 2009 in International Patent Application No. PCT/GB20091000640.

Written Opinion of the International Searching Authority dated Sep. 4, 2009 in International Patent Application No. PCT/GB2009/000640.

Aug. 13, 2015 Office Action isused in Chinese Patent Application No. 201310392113.6.

* cited by examiner

TOUCH TRIGGER MEASUREMENT PROBE

This is a Continuation of application Ser. No. 12/918,895 filed Aug. 23, 2010, which in turn is a National Phase of PCT/GB2009/000640 filed Mar. 9, 2009, which claims the benefit of British Application No. 0804467.9 filed Mar. 11, 2008. The disclosure of the prior applications is hereby incorporated by reference herein in its entirety.

BACKGROUND

The present invention relates to measurement probes for use with co-ordinate positioning apparatus and in particular to touch trigger measurement probes mountable in the spindle of a machine tool.

Touch trigger measurement probes for mounting in the spindle of machine tools are known. A typical measurement probe of this type comprises a workpiece-contacting stylus that can be deflected relative to the body or housing of the probe. One or more sensors are provided to measure deflection of the probe relative to the probe body and a so-called trigger signal is issued whenever a certain amount of stylus deflection has occurred to indicate that the stylus has made contact with a workpiece. This trigger signal is fed to the machine tool controller which takes a reading of the position of the machine tool spindle at the time the trigger signal is issued thereby allowing the co-ordinates of points on the surface of the workpiece to be measured.

Examples of strain gauge based touch trigger probes are described in WO2006/120403 and WO2006/100508. The probe comprises a workpiece-contacting stylus that is attached to the probe body via a sensor mechanism that comprises three strain gauges. The signals from the three strain gauges are passed to a processor which combines and analyses those signals and produces a trigger signal whenever the deflection of the workpiece-contacting stylus exceeds a predetermined deflection threshold or limit.

SUMMARY

Selecting an appropriate deflection threshold is key to ensuring reliable touch trigger measurement probe operation. If the deflection threshold is set too low, machine vibrations or movement of the probe will induce enough stylus deflection to exceed the threshold even in the absence of workpiece contact; this is typically termed "false triggering". Conversely, using a high predetermined deflection threshold reduces the susceptibility to false triggering but increases the amount of stylus deflection or pre-travel that is required after initial stylus contact and before the trigger signal is issued. This increased pre-travel can reduce measurement accuracy in various ways; for example, errors may arise due to stylus slippage.

To help prevent false triggering, it is also known to provide a so-called filter delay so that a trigger signal is only issued by the probe when stylus deflection continuously exceeds the deflection threshold for a predetermined amount of time. Introducing a filter delay can reduce false triggering by ensuring that any transient deflections (e.g. from machine vibrations or rapid probe movements) do not result in issuance of a trigger signal.

It is also known that measurement probes for machine tools often communicate trigger signals wirelessly to a probe interface that in turn passes the trigger signal to an input of the coordinate positioning apparatus. Providing a centrifugal switch or other mechanism to turn on the measurement sensors in a wireless measurement probe when it is wished to acquire measurements has also been described previously. For example, WO 2004/090467 describes a touch trigger probe that automatically switches itself on when a certain characteristic motion (e.g. rotation of the probe) is sensed by an accelerometer.

According to a first aspect of the invention, a measurement probe comprises; a stylus holder deflectably mounted to a probe housing, one or more sensors for sensing deflection of the stylus holder relative to the probe housing, a processor for producing a trigger signal when the deflection sensed by the one or more sensors meets a trigger condition, and an accelerometer for measuring acceleration of the measurement probe, wherein the trigger condition is alterable, during use, in response to the acceleration measured by the accelerometer.

The present invention thus provides a measurement probe having a stylus holder for holding a workpiece contacting stylus that is deflectable relative to a probe housing. One or more sensors (e.g. strain gauge, piezo-electric, optical or capacitive sensors) are also provided to measure deflection of the stylus. The measurement probe also includes a processor that, in use, is arranged to produce a trigger signal whenever the stylus deflection as measured by the sensors meets a certain trigger condition. For example, the trigger condition may be met (i.e. such that a trigger signal is produced) whenever the measured stylus deflection continuously exceeds a certain deflection threshold for a certain period of time. In accordance with the present invention, the trigger condition applied by the processor is alterable during use and in particular can be altered in response to the acceleration measured by the accelerometer. Varying the trigger condition in this manner allows the sensitivity of the measurement probe to be altered during use and in particular allows the measurement probe to be desensitised when the acceleration it is experiencing is of a certain type (e.g. rotation, vibration, linear acceleration etc) and/or exceeds a certain level.

A measurement probe of the present invention thus has the advantage, compared with prior art devices, that it can be both sensitive when being used to acquire touch trigger measurement data and relatively insensitive when being subjected to the prolonged accelerations that can be associated with moving the measurement probe around in the machine environment between measurements or during tool change operations. Altering the trigger condition during use in accordance with the present invention allows acceleration induced deflections that would otherwise result in issuance of a false trigger to be ignored. In particular, this improved performance can be achieved without permanently using a high deflection threshold setting that would also reduce probe sensitivity during measurement acquisition. The measurement probe of the present invention can thus provide a touch trigger probe measurement system that can acquire measurements of the position of points on the surface of an object with an improved level of confidence compared with prior art systems.

The deflection sensed by the one or more sensors may be compared to many different types of trigger condition by the processor. Advantageously, the trigger condition comprises a deflection threshold, the trigger signal being issued when the deflection sensed by the one or more sensors exceeds the deflection threshold. The deflection threshold may conveniently be alterable, during use, in response to the acceleration measured by the accelerometer. For example, the deflection threshold may be raised in response to an acceleration being measured by the accelerometer and lowered when such an acceleration is no longer present.

If a plurality of sensors are provided, the trigger condition may comprise a plurality of deflection thresholds and the deflection measured by each sensor may be separately compared to one of the plurality of deflection thresholds. The deflection threshold used for each sensor may be the same or different. Conveniently, each deflection threshold is alterable, during use, in response to the acceleration measured by the accelerometer. Each deflection threshold may be altered in a similar, or different, manner to the other deflection thresholds in response to measured acceleration. In such an example, the trigger condition may be met when the deflection sensed by one (or a subset) of the sensors exceeds the relevant deflection threshold. In other words, a "first-past-the-post" trigger condition may be provided in which a trigger signal is issued by the processor when the deflection measured by one sensor exceeds its threshold.

Alternatively, the deflections measured by a plurality of sensors may be combined (e.g. by the processor) to provide a resultant deflection. The trigger condition may then comprise a resultant deflection threshold; the trigger signal being issued when the resultant deflection exceeds the resultant deflection threshold. The deflection measured by each sensor may be combined to provide a resultant deflection in a variety of ways; for example, a rectify-and-sum or a sum-of-squares technique may be used to combine deflection measurements from the plurality of sensors. Advantageously, deflection signals from a plurality of sensors may be combined using the technique described in WO2006/120403, the contents of which are incorporated herein by reference. The resultant deflection threshold may be alterable, during use, in response to the acceleration measured by the accelerometer.

It should also be noted that the actual amount of stylus deflection (e.g. in microns) need not be calculated. All that is necessary is that the one or more sensors generate one or more signals that vary in relation to the amount of stylus deflection. For example, a sensor may provide a sensor signal of a voltage that is proportional to the amount of stylus deflection or a number of such sensor signals may be combined to provide a resultant stylus deflection voltage signal. The trigger condition may then comprise a deflection threshold in the form of a voltage threshold; if the voltage of a sensor signal or resultant signal exceeds the voltage threshold a trigger signal is produced. In such an example, the voltage threshold could be raised and lowered in response to the measured probe acceleration.

Advantageously, the trigger condition comprises a deflection threshold and a filter delay, the trigger signal being issued when the deflection sensed by the one or more sensors continuously exceeds the deflection threshold for longer than the filter delay. The filter delay is conveniently alterable, during use, in response to the acceleration measured by the accelerometer. As mentioned above, the deflection threshold may also be alterable during use.

The measurement probe may include any known type of accelerometer. Conveniently, the accelerometer comprises a micro electro-mechanical system (MEMS) accelerometer. Preferably, the accelerometer is formed from three accelerometer components. The three accelerometer components may conveniently be arranged to measure acceleration along three mutually orthogonal axes. In this manner, the different types of acceleration (e.g. rotation, linear motion etc) to which the probe is subjected can be determined. Advantageously, one of the axes along which acceleration is measured is substantially coincident with the longitudinal probe axis or the long axis of the probe stylus.

The trigger condition applied by the processor is advantageously alterable in response to the magnitude of the acceleration measured by the accelerometer. For example, the trigger condition may be altered (e.g. a deflection threshold and/or filter delay increased) in proportion to the magnitude of acceleration measured by the accelerometer. The trigger condition applied by the processor may also be alterable in response to the direction of the acceleration measured by the accelerometer. For example, the trigger condition may be changed when a certain direction of acceleration is measured. The trigger condition may also be alterable in response to both the magnitude and direction of the acceleration measured by the accelerometer. For example, the trigger condition may be altered by an amount that is proportional to the acceleration in a certain direction or by a factor that arises from the combination of the measured magnitude of acceleration in a plurality of different directions.

The trigger condition may conveniently be altered dependent on the type of acceleration that occurs. Advantageously, the processor is arranged to analyse the acceleration measured by the accelerometer to determine the type of motion to which the measurement probe is being subjected. The processor may thus be arranged to differentiate between the various different types of acceleration that might be expected, such as probe rotation, linear movement of the probe, vibration or mechanical shocks applied to the probe etc. Conveniently, the alteration made to the trigger condition depends on the type of motion determined by the processor. For example, the trigger condition may be altered only in response to certain types of motion or the alteration to the trigger condition may be different for different types of motion. For example, the alteration to the trigger condition may be greater for accelerations perpendicular to the longitudinal or z-axis than for acceleration along the z-axis. Rotary accelerations or vibrations may also be arranged to produce a different change to the trigger condition than linear accelerations of the same magnitude.

The trigger condition may be continuously or incrementally variable in relation to the acceleration measured by the accelerometer. The trigger condition may conveniently be altered between a plurality of trigger conditions. Preferably, the trigger condition is altered, but triggering is not totally suppressed, in response to the acceleration measured by the accelerometer. Advantageously, the trigger condition may be selected from a stored set of previously determined trigger conditions. The probe may thus conveniently comprise a memory for storing a plurality of preset trigger conditions, wherein the trigger condition applied by the processor (i.e. the trigger condition against which the deflection sensed by the one or more sensors is compared) is selected from the plurality of preset trigger conditions based on the acceleration measured by the accelerometer. Furthermore, predetermined criteria may be used by the processor for selecting a trigger condition from the plurality of trigger conditions.

In other words, multiple possible trigger conditions may be stored in a memory (e.g. an electronic memory) within the measurement probe and one of these trigger conditions may then be chosen for use by the processor based on a set of predetermined criteria. For example, the processor may compare the deflection measured by the one or more sensors to a first trigger condition in the absence of any significant acceleration. The processor may then use a second trigger condition when linear acceleration is within a certain range, a third trigger condition when acceleration due to rotation exceeds a certain limit, a fourth trigger condition when significant vibrations are present etc. In this manner, the trigger condition applied by the measurement probe in the presence of particular types of acceleration are determined in advance.

In a preferred embodiment, the processor comprises a first processor stage and a second processor stage. The first processor stage is arranged to produce a preliminary trigger signal when the deflection sensed by the one or more sensors meets a first trigger condition. The second processor stage is arranged to receive the preliminary trigger signal and produce a trigger signal on receipt of the preliminary trigger signal if the acceleration sensed by the accelerometer is below an acceleration threshold. In other words, a trigger signal may be issued based on the first trigger condition if no (or minimal) probe acceleration is present. It can thus be seen that, in the absence of any acceleration, a trigger signal is issued based on comparison of the deflection sensed by the one or more sensors to the first trigger condition. In other words, the measurement probe operates as a standard probe in the absence of any significant acceleration.

If acceleration above the acceleration threshold is sensed by the accelerometer, the second processor stage may be arranged to not issue a trigger signal on receipt of the preliminary trigger signal from the first processor stage. In other words, the second processor stage may block issuance of a trigger signal if acceleration above a threshold is sensed by the accelerometer. In this manner, the processor can thus be seen to apply a normal or first trigger condition when sensed acceleration is below an acceleration threshold and a second trigger condition in which issuance of a trigger signal is completely blocked when acceleration exceeds the acceleration threshold.

Advantageously, if the acceleration sensed by the accelerometer is above the acceleration threshold, the second processor stage is arranged to modify the first trigger condition applied by the first processor stage and to only issue a trigger signal if the first processor stage produces a preliminary trigger signal when the deflection sensed by the one or more sensors meets the modified first trigger condition. In this manner, a normal trigger response is provided by using the first trigger condition until a preliminary trigger signal is generated that indicates the deflection sensed by the one or more meets that first trigger condition. If the probe is not undergoing any significant acceleration, a trigger signal is issued. If the probe has been, or is being, subjected to acceleration the first trigger condition is modified to take account of such acceleration and the trigger signal is only issued if the deflection sensed by the one or more sensors meets the first trigger condition as modified.

In this manner, modification of the trigger condition only occurs when the first trigger condition is met. In other words, the trigger condition applied by the processor is altered when it appears that a false trigger event is likely to occur as determined from the measured probe acceleration. Reducing the measurement probe sensitivity, instead of totally desensitising the probe, when acceleration is sensed has the advantage that a trigger signal will still be issued if the probe is deflected by contacting an object.

It should be noted that the processor (including any constituent processor stages) may be provided as analogue and/or digital processing circuitry as appropriate. For example, the processor may be a bespoke analogue and/or digital (e.g. hardwired) circuit. The processor may also be provided using programmable logic, such as a field programmable gate array (FPGA) or similar. The processor may also be implemented via software running on a general purpose microprocessor. The processor may be located outside the probe housing (e.g. in a separate interface). Conveniently, the processor is located within the probe housing.

Any appropriate sensor or sensors may be used to sense deflection of the stylus holder relative to the probe housing. For example, piezo-electric, optical or capacitance based sensors may be provided. Conveniently, the one or more sensors comprise one or more strain gauge sensors. Advantageously, three strain gauge sensors are provided. For example, a strain gauge arrangement of the type described previously in WO2006/120403 may be provided.

The measurement probe may comprise a workpiece contacting stylus formed integrally with the stylus holder. Advantageously, a stylus may be releasably attached to the stylus holder using a screw thread attachment or the like. The measurement probe may have a hardwired link to an interface or machine tool controller for communicating the trigger signal. Advantageously, the measurement probe comprises a wireless communications module for passing the trigger signal to a remote probe interface. The probe may be battery operated and may be configured for mounting in the spindle of a machine tool.

According to a second aspect of the invention, there is provided a method of operating a measurement probe, the measurement probe comprising a probe body and a deflectable stylus for contacting a workpiece, the method comprising the steps of; (i) measuring deflection of the stylus relative to the probe body, (ii) issuing a trigger signal when the deflection measured in step (i) meets a trigger condition, wherein, the method further comprises the step of measuring acceleration of the measurement probe and altering the trigger condition used in step (ii) in response to the measured acceleration.

As also described herein, a measurement probe may comprise a stylus holder deflectably mounted to a probe housing, means for producing a trigger signal when the stylus is deflected by contact with an object, and an accelerometer for measuring acceleration of the measurement probe, wherein the sensitivity of the measurement probe to stylus deflection is decreased when the measurement probe is subjected to acceleration.

Also described herein is a measurement probe, comprising; a stylus holder deflectably mounted to a probe housing, one or more sensors for sensing deflection of the stylus holder relative to the probe housing, a processor for producing a trigger signal when the deflection sensed by the one or more sensors meets a trigger condition, and an accelerometer for measuring acceleration of the measurement probe, wherein the trigger signal produced by the processor is only output by the measurement probe when the acceleration measured by the accelerometer is below an acceleration threshold. In other words, trigger signal issuance is blocked when the acceleration measured by the accelerometer exceeds the acceleration threshold. The trigger condition used by the processor may be alterable during use.

BRIEF DESCRIPTION OF THE DRAWINGS

The invention will now be described, by way of example only, with reference to the accompanying drawings in which.

DETAILED DESCRIPTION

Figure 1:
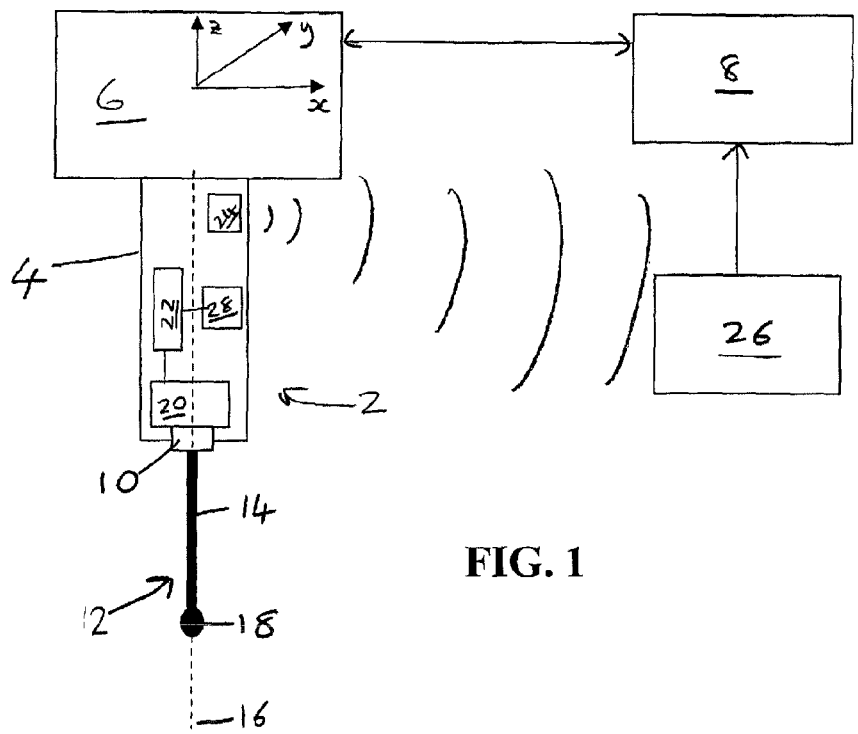
FIG. 1 illustrates a measurement probe of the present invention.

Referring to FIG. 1, a touch trigger measurement probe 2 is illustrated having a probe housing or body 4 attached to the rotatable spindle 6 of a machine tool. The spindle 6 is attached to a machine head (not shown) that can be moved about the machine envelope along three mutually orthogonal (x,y,z) axes. Movement of the spindle is controlled by a computer numerical controller 8. The position of the spindle 6 is also measured by position encoders (not shown) and such positional information is provided to the CNC 8.

The measurement probe 2 has a stylus holder 10 to which a stylus 12 is attached by a screw thread connection. The stylus 12 comprises a stem 14 that extends along an longitudinal axis 16 and is terminated by a stylus tip or ball 18 for contacting an object (e.g. a workpiece or calibration artefact) mounted to the bed of the machine tool.

The stylus holder 10 is connected to the probe housing 4 via a strain sensor 20. In this example, the strain sensor 20 comprises three fairly rigid, radially spaced, spokes each having a strain gauge attached thereto for sensing the strain in each spoke. The sensed strain thus provides an indication of the force with which the stylus 12 is being deflected relative to the probe body 4. More details about the strain sensor arrangement can be found elsewhere; for example, see WO2006/100508 and WO2006/120403, the contents of which are hereby incorporated herein by reference.

The probe 2 also comprises a processor 22 that receives the outputs of the strain sensor 20. In particular, the processor 22 receives the three outputs of the three strain gauges in the form of varying voltage signals caused by resistance changes induced by the applied strain. The processor is arranged to combine the three strain gauge signals received from the strain sensor 20 in a known manner to produce a resultant stylus deflection signal and to also generate a trigger signal when a certain trigger condition is met. For example, the processor 22 may issue a trigger signal when the resultant stylus deflection signal has continuously exceeded a deflection threshold for a certain period of time; the period of time being commonly termed the filter delay period or filter delay. As explained in more detail below, the trigger condition is not fixed and can be varied during use.

The probe 2 also comprises a wireless (RF) communications module 24 that communicates the trigger signal to a remote probe interface 26 over a RF link in a known manner. The trigger signal may then be passed to the NC 8 by the interface 26. In this manner, the co-ordinate position of the spindle within the machine envelope can be found whenever a trigger signal is issued by the measurement probe thereby allowing co-ordinate position data to be established for points on the surface of an object.

The touch trigger probe 2 also comprises an accelerometer 28. The accelerometer 28 is a MEMS based accelerometer that measures three acceleration components along three mutually orthogonal axes. The accelerometer 28 is orientated to measure a component of acceleration along the longitudinal axis 16 and along two axes in a plane perpendicular to the longitudinal axis 16. The output of the accelerometer is passed to the processor 22 where it is used to adjust the trigger condition that is applied by the processor when assessing the resultant stylus deflection signal generated from the signals received from the strain sensor 20. In particular, the deflection threshold and/or filter delay may be increased by the processor in response to an increase in the measured probe acceleration and reduced when such acceleration declines.

Figure 2A:
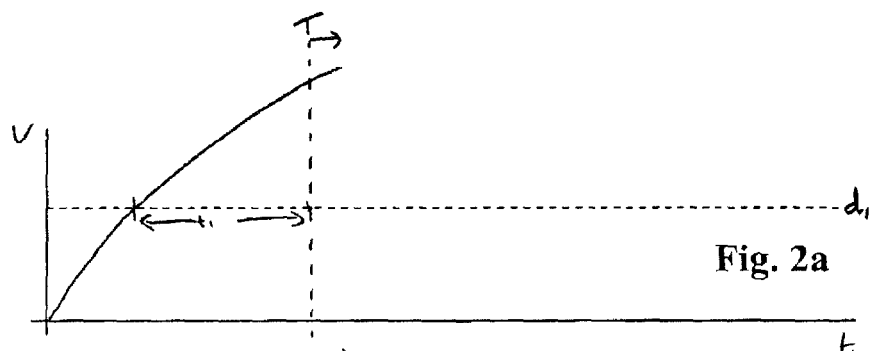
FIGS. 2a to 2c illustrate deflection signals relative to a trigger condition.
Figure 2B:
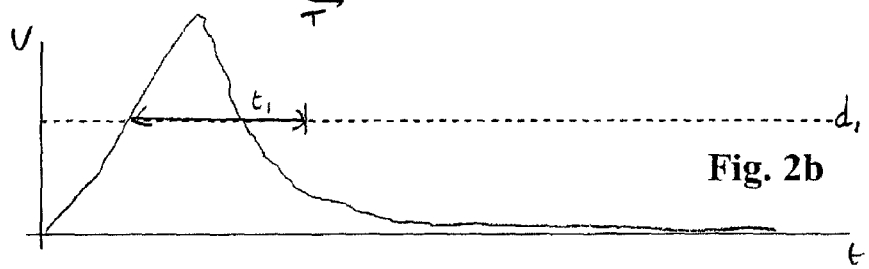
Figure 2C:
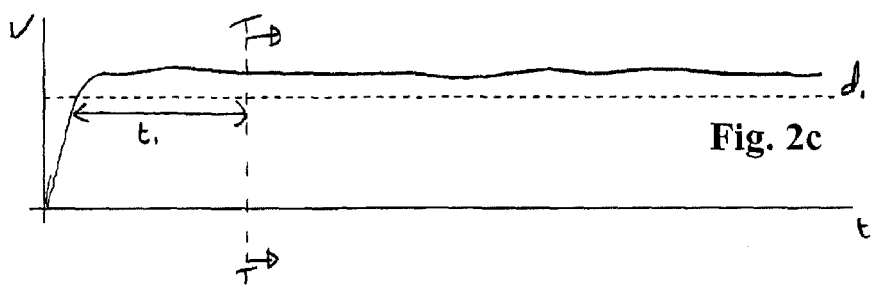

Referring to FIGS. 2a to 2c, the operation of a processor applying a single trigger condition is illustrated. In particular, the FIGS. 2a to 2c illustrate a processor that is arranged to issue a trigger signal when a deflection threshold d1 is continuously exceeded for a time period t1.

FIG. 2a illustrates the resultant deflection (voltage) signal from by the strain sensor 20 of the measurement probe as the stylus is brought into contact with a point on the surface of an object. It can be seen that the deflection increases as the stylus tip is driven into the surface. After initial contact, the deflection threshold is breached and the deflection remains above that threshold for time t1 whereupon a trigger signal (T) is issued and probe movement is halted. It should be noted that, in reality, surface bounce and other effects may cause a deviation from the shape of the curve that is shown in FIG. 2a, especially in the time period shortly after initial surface contact is made.

As can be seen in FIG. 2b, the use of a filter delay can prevent some false triggering when the probe is moved around the machine tool between measurements. In particular, FIG. 2b shows the transient increase in stylus deflection as a measured probe is accelerated from a first speed (e.g. zero) to a second speed (e.g. the speed used to move the probe into the vicinity of the workpiece from a safety plane). Although the deflection briefly exceeds the d1 deflection threshold, it only does so for a short period of time. In particular, deflection d1 is not exceeded for more than the filter delay t1 so there is no (false) trigger signal issued in this instance. A similar transient crossing of the deflection threshold occurs in the presence of vibrations or mechanical shocks to the probe.

FIG. 2c shows a third situation in which a false trigger signal would issue. In particular, FIG. 2c shows the resultant deflection signal produced when the measurement probe is rotated in the spindle. It can be seen that the rotation causes the sensed deflection to exceed the d1 deflection threshold and this threshold is exceeded for a time period much greater than the filter delay (t1). A (false) trigger signal T would thus be issued even though no workpiece contact has occurred.

Prior to the present invention, it should be noted measurement probes were often configured to use a certain deflection threshold d1 and filter delay t1 prior to taking any measurements. In particular, an operator would set the deflection threshold and filter delay to appropriate values in an attempt to ensure that any expected movements or vibration of the measurement probe did not result in a trigger signal being falsely issued. Although increasing the deflection threshold when taking measurements is known to reduce false triggering, it also increases the amount of elapsed time or stylus deflection between the stylus initially contacting a point on the surface of a workpiece and the deflection threshold being exceeded. This increase in pre-travel can result in increased stylus slippage and thus reduced measurement accuracy. For a typical measurement probe, the filter delay t1 would also be set to be several milliseconds or tens of milliseconds long.

Use of such a filter delay can remove false triggers due to vibration or short periods of probe acceleration but has been found to be unsuitable for distinguishing between longer periods of acceleration (e.g. due to probe rotation or probe movement along an arced or circular path) and deflections due to stylus contact with an object. The maximum length of the filter delay is, in any case, set by the maximum stylus over-travel that can occur for a given speed before stylus breakage. Extension of the filter delay typically can not provide a way of removing false triggers due to prolonged periods (e.g. of the order of several tenths of a second) of probe acceleration.

The present invention allows the trigger condition (e.g. the deflection threshold and/or the filter delay) to be altered during use. In particular, the use of probe acceleration data from the accelerometer contained with the measurement probe is used to dynamically adjust the trigger condition during use. In other words, prolonged periods of acceleration can be distinguished from stylus deflection due to workpiece contact by measuring probe acceleration.

Figure 3:
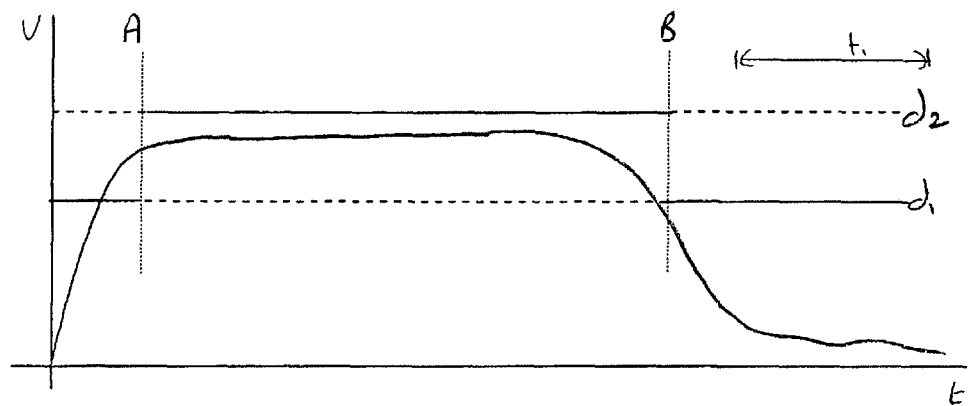
FIG. 3 illustrates altering the trigger condition during operation.

Referring to FIG. 3, a plot of the sensed resultant deflection as a function of time is illustrated as a measurement probe is rotated by the spindle of a machine tool. The deflection threshold being used by the processor at a particular time is shown in FIG. 3 as a solid line and the filter delay is kept constant at t1.

It can be seen that the measured deflection increases rapidly as probe rotation begins and soon exceeds a first deflection threshold d1. However, the accelerometer within the probe senses that rotary motion is underway and increases the deflection threshold from d1 to d2. The new deflection threshold d2 is higher than the sensed deflection and hence no (false) trigger signal issues. The slowing of the rotary motion is also picked up by the accelerometer and the applied deflection threshold is thus reduced back to d1 as the probe rotation stops. The deflection threshold d2 is thus applied only during a time period (between points A and B of FIG. 3) when there is probe rotation and the lower deflection threshold d1 is applied before and after this time (e.g. during measurements). In this manner, the measurement probe can be made insensitive to rotational motion without having to set a higher deflection threshold that is also used whilst taking measurements.

It should be noted that although two discrete deflection thresholds d1 and d2 are shown in FIG. 3, any number of thresholds may be used. For example, multiple thresholds may be provided and a required threshold selected based on the magnitude of the measured acceleration at that particular point in time. The threshold may also be continuously or incrementally variable in response to the measured acceleration. Furthermore, the filter delay may also or alternatively be varied in response to the measured acceleration. The processor may also be arranged to analyse the outputs of the accelerometer to determine the type of motion present; the deflection threshold or filter delay may then be set based on the type and/or magnitude of such motion. The probe may include a memory to store a look-up table of trigger conditions to be applied in the presence of certain types and/or magnitudes of acceleration or the trigger condition may be calculated as required using a set of predetermined rules.

The trigger condition may be varied to desensitise the measurement probe whenever a certain level of acceleration is measured by the accelerometer. Alternatively, the probe may be desensitised only in the presence of an acceleration that is found to cause a certain trigger condition to be met.

Figure 4:
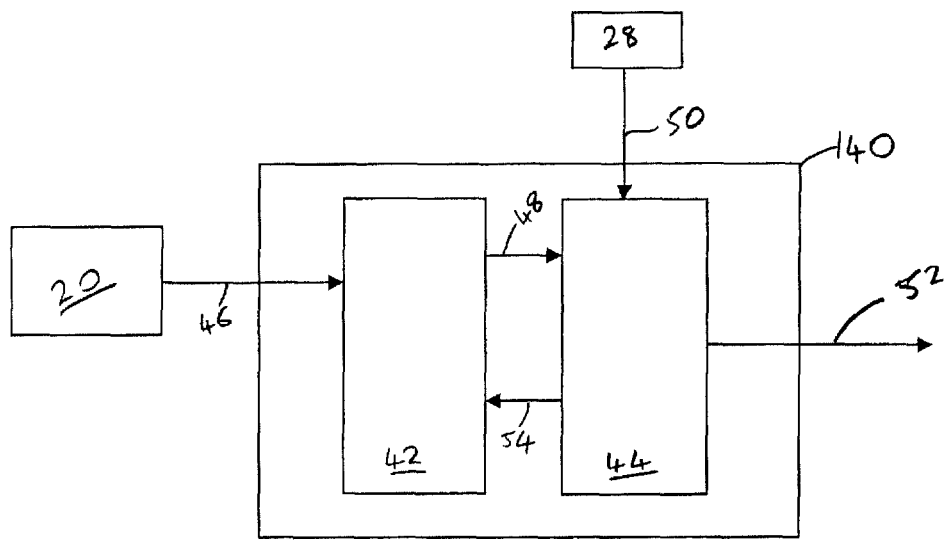
FIG. 4 illustrates a processor of the present invention in more detail.

Referring to FIG. 4, an embodiment of the processor of the present invention is illustrated in more detail. In particular, a processor unit 40 is illustrated that comprises a first processor stage 42 and a second processor stage 44. The processor unit 40 in this example is an application specific integrated circuit (ASIC), but many other types of processor may alternatively be used.

The first processor stage 42 is arranged to receive a resultant probe deflection signal 46 from the strain sensor 20 of the measurement probe. The first processor stage monitors the deflection signal 46 and issues a preliminary trigger signal 48 when the deflection signal 46 meets a first trigger condition. In this example, the first trigger condition is met when the deflection signal continuously exceeds a first deflection threshold d1 for a time t1.

The second processor stage 44 is arranged to receive the preliminary trigger signal 48 and also monitors an acceleration signal 50 from the accelerometer 28. If a preliminary trigger signal 48 is received, the second processor issues a trigger signal 52 to indicate that workpiece contact has occurred, but only if no acceleration has been sensed immediately prior to receipt of the preliminary trigger signal.

If any acceleration has been sensed, it is possible that the preliminary trigger signal was produced not because of workpiece contact but because of a stylus deflection induced by that acceleration. In such a case, the second processor stage 44 does not issue a trigger signal but instead passes an instruction signal 54 to the first processor stage 42 that modifies the first trigger condition. This modification may be based on the magnitude and/or type of acceleration that is sensed.

The first processor stage then applies the modified trigger condition to the received deflection signal 46 and continues to issue a preliminary trigger signal only if the first trigger condition as modified is met. If the preliminary trigger signal is still issued even after modification of the first trigger condition, the second processor stage issues a trigger signal 52. If the preliminary trigger signal is suppressed following modification of the first trigger condition, it can be safely assumed that no stylus contact has occurred and no trigger signal will then be issued by the measurement probe. Once the second processor stage 44 senses that acceleration has reduced, it may instruct the first processor stage 42 to apply the (unmodified) first trigger condition again.

The two stage process mentioned above has the advantage that the trigger condition is only adjusted if a preliminary (possibly "false") trigger signal is generated (e.g. due to the acceleration). In this way, the first trigger condition alone (e.g. the selected deflection threshold and filter delay) can be used to suppress certain acceleration induced deflections and the probe is only desensitised by adjusting the first trigger condition if this proves inadequate.

It should be remembered that the specific embodiments described above are merely examples and that the skilled person would appreciate the numerous ways in which the present invention could be implemented.

The invention claimed is:

1. A measurement probe, comprising;
   a stylus holder deflectably mounted to a probe housing,
   one or more sensors for sensing deflection of the stylus holder relative to the probe housing,
   a processor for producing a trigger signal when the deflection sensed by the one or more sensors meets a trigger condition, and
   an accelerometer for measuring acceleration of the measurement probe,
   wherein the trigger signal produced by the processor is only output by the measurement probe when the acceleration measured by the accelerometer is below an acceleration threshold.

2. A measurement probe according to claim 1, wherein the trigger condition can be altered during use.

3. A measurement probe according to claim 1, wherein the accelerometer comprises a micro electro-mechanical system accelerometer.

4. A measurement probe according to claim 1, wherein the accelerometer is formed from three accelerometer components, the three accelerometer components being arranged to measure acceleration along three mutually orthogonal axes.

5. A measurement probe according to claim 1, wherein the one or more sensors comprise one or more strain gauge sensors.

6. A measurement probe according to claim 1, comprising a wireless communications module for passing the trigger signal to a remote probe interface.

* * * * *